United States Patent
Egan

(10) Patent No.: US 7,170,703 B1
(45) Date of Patent: Jan. 30, 2007

(54) FLAW DETECTION IN DISK DRIVE USING SIGNIFICANT SAMPLES OF DATA PATTERN STORED ON DISK

(75) Inventor: Curtis W. Egan, Thornton, CO (US)

(73) Assignee: Maxtor Corporation, Longmont, CO (US)

( * ) Notice: Subject to any disclaimer, the term of this patent is extended or adjusted under 35 U.S.C. 154(b) by 327 days.

(21) Appl. No.: 09/848,089

(22) Filed: May 2, 2001

Related U.S. Application Data

(60) Provisional application No. 60/203,088, filed on May 9, 2000.

(51) Int. Cl.
G11B 5/09 (2006.01)
(52) U.S. Cl. ....................................... 360/53
(58) Field of Classification Search ................. 360/53, 360/75, 46; 375/341
See application file for complete search history.

(56) References Cited

U.S. PATENT DOCUMENTS

| | | | |
|---|---|---|---|
| 3,771,143 A | 11/1973 | Taylor | 340/172.5 |
| 4,929,894 A * | 5/1990 | Monett | 360/31 |
| 5,793,548 A * | 8/1998 | Zook | 360/51 |
| 5,835,930 A | 11/1998 | Dobbek | 711/4 |
| 6,100,683 A * | 8/2000 | Lim et al. | 360/31 |
| 6,104,188 A | 8/2000 | Coker et al. | 324/212 |
| 6,151,180 A | 11/2000 | Bang | 360/53 |
| 6,208,476 B1 * | 3/2001 | Park | 360/31 |
| 6,252,731 B1 * | 6/2001 | Sloan et al. | 360/31 |
| 6,281,676 B1 | 8/2001 | Ottesen et al. | 324/212 |
| 6,288,856 B1 * | 9/2001 | Ottesen et al. | 360/31 |
| 6,381,203 B1 * | 4/2002 | Muramatsu | 369/53.1 |
| 6,490,691 B1 | 12/2002 | Kimura et al. | 714/8 |
| 6,501,607 B2 * | 12/2002 | Keirn et al. | 360/31 |
| 6,513,141 B1 * | 1/2003 | Livingston | 360/53 |
| 6,580,768 B1 * | 6/2003 | Jaquette | 375/341 |
| 6,606,211 B1 * | 8/2003 | Lim et al. | 360/53 |
| 6,646,822 B1 * | 11/2003 | Tuttle et al. | 360/46 |
| 2001/0010085 A1 | 7/2001 | Rafanello et al. | 714/710 |
| 2004/0205426 A1 | 10/2004 | Muranaka et al. | 714/704 |

OTHER PUBLICATIONS

Egan, et al., U.S. Appl. No. 09/848,109 filed May 2, 2001, "Method and Apparatus for the Detection of Multiple Small Defects in a Flaw Scan Detection System".

"Online Data Mining for Co-Evolving Time Sequences"; *School of Computer Science, Carnegie Mellon University, Pittsburgh, PA 15213*; reports-archive.adm.cs.cmu.edu/ anon/1999/CMU-CS-99-171.ps. (26 pages).

* cited by examiner

*Primary Examiner*—Wayne Young
*Assistant Examiner*—Glenda P. Rodriguez
(74) *Attorney, Agent, or Firm*—Tejpal S. Hansra

(57) ABSTRACT

Detecting flaws in a disk drive includes sampling a read signal provided by reading a data pattern from a disk to obtain samples, obtaining significant samples from the samples, deriving a value from the significant samples, and reporting a flaw if a comparison between the derived value and a threshold value is unacceptable.

70 Claims, 5 Drawing Sheets

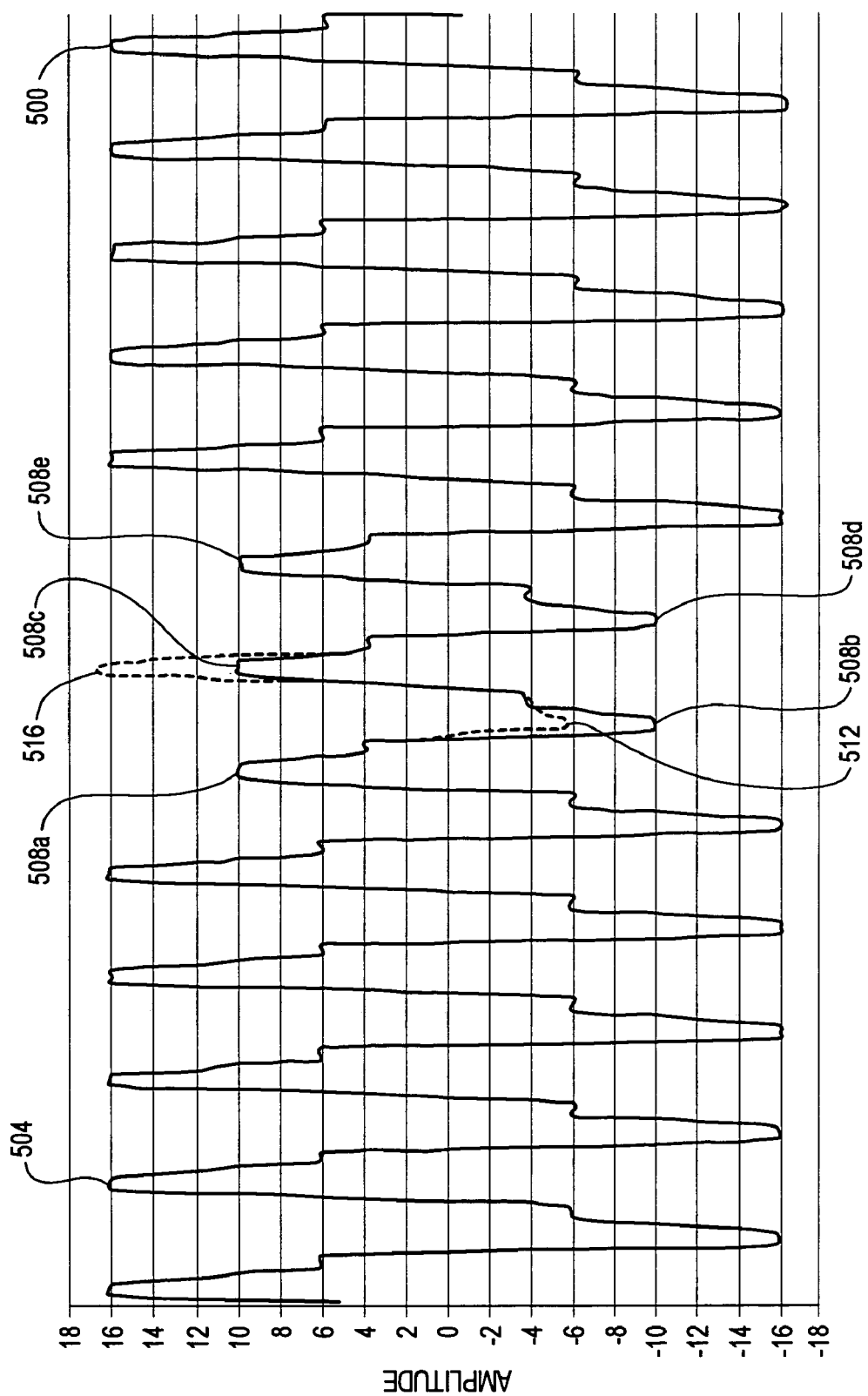

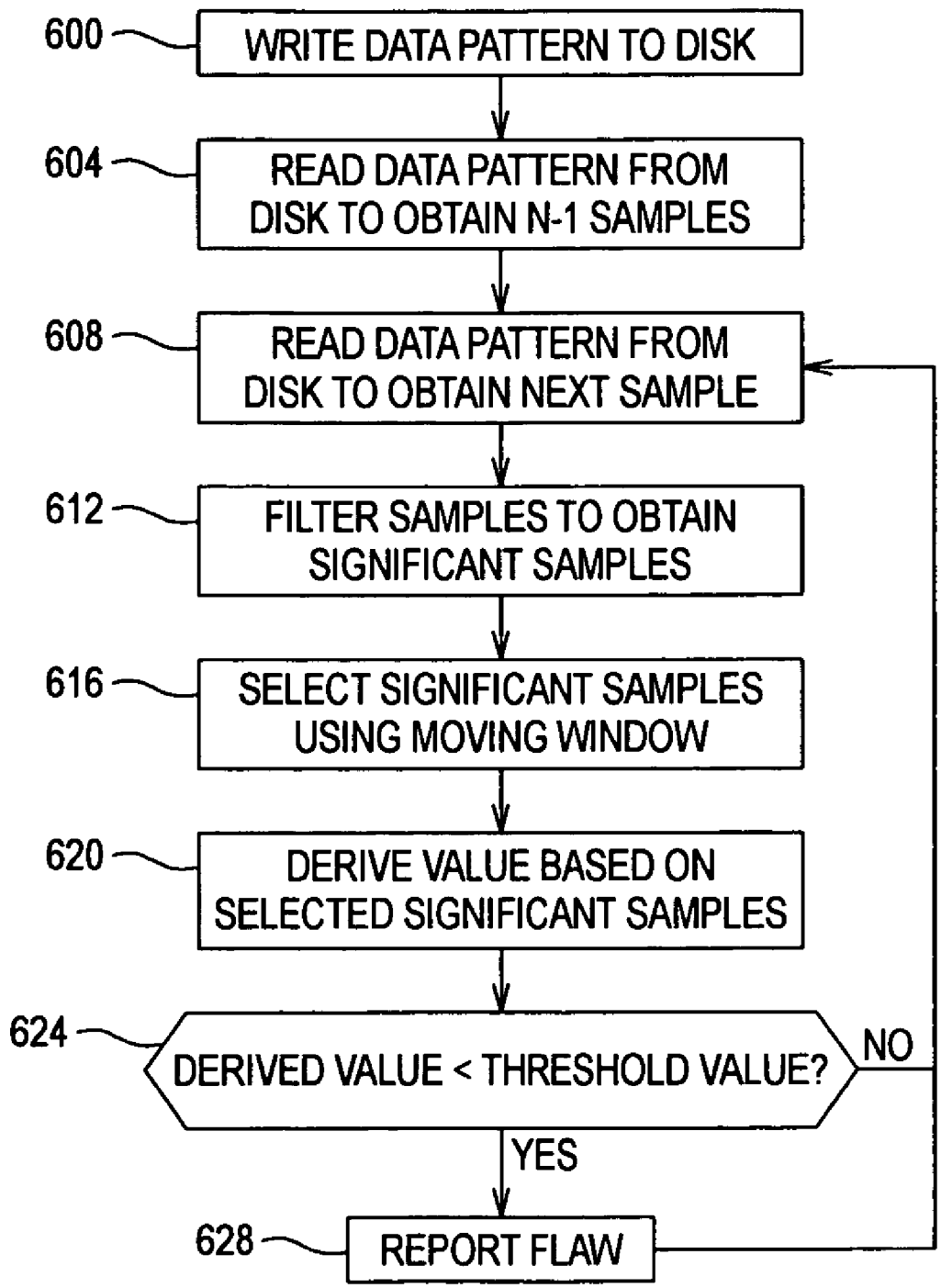

FLAW DETECTION IN DISK DRIVE USING SIGNIFICANT SAMPLES OF DATA PATTERN STORED ON DISK

CROSS-REFERENCE TO RELATED APPLICATIONS

This application claims priority from U.S. Provisional Application Ser. No. 60/203,088, filed May 9, 2000, the disclosure of which is incorporated herein by reference in its entirety.

FIELD OF THE INVENTION

The present invention relates to flaw detection in storage media, and in particular, to flaw detection in a disk in a disk drive using samples generated by reading a data pattern on the disk.

BACKGROUND OF THE INVENTION

Disk drives store information on magnetic disks. Typically, the information is stored in concentric tracks on the disk and the tracks are divided into servo sectors that store servo information and data fields that store user data. A transducer head reads from and writes to the disk. The transducer head is mounted on an actuator arm assembly that moves the transducer head radially over the disk. Accordingly, the actuator arm assembly allows the transducer head to access different tracks on the disk. The disk is rotated by a spindle motor at high speed, allowing the transducer head to access different data fields within each track on the disk.

FIG. 1 illustrates a disk drive 100 that includes a base 104 and a magnetic disk (or disks) 108 (only one of which is shown). The disk 108 is connected to the base 104 by a spindle motor (not shown) mounted within or beneath a hub 112 such that the disk 108 rotates relative to the base 104. An actuator arm assembly 116 is connected to the base 104 by a bearing 120 and suspends a transducer head 124 at a first end. The transducer head 124 reads data from and writes data to the disk 108. A voice coil motor 128 pivots the actuator arm assembly 116 about the bearing 120 to radially position the transducer head 124 relative to the disk 108. By changing the radial position of the transducer head 124 relative to the disk 108, the transducer head 124 accesses different tracks 132 on the disk 108. The voice coil motor 128 is operated by a controller 136 that is operatively connected to a host computer (not shown). A channel 140 processes data read from the disk 108 by the transducer head 124.

FIG. 2 illustrates the disk 108 in more detail. The tracks 132 are divided into data fields 204a–204h and servo sectors 208a–208h. The data fields 204a–204h store user data and the servo sectors 208a–208h store servo information to provide the transducer head 124 with its radial position over the disk 108.

Although the disk 108 has a relatively small number of tracks 132, data fields 204 and servo sectors 208, a typical disk contains a very large number of tracks, data fields and servo sectors. For example, disks having over 30,000 tracks per inch and 120 servo sectors per track are presently available. In addition, alternate configurations of the disk 108 are possible. For example, one surface of the disk 108 can be dedicated to servo information while the other surface of the disk 108 (and any remaining disks 108 in the disk drive 100) can exclusively store user data.

Data is stored on the disk 108 using data patterns with magnetic transitions between opposite magnetic polarities. For example, the magnetic polarity in a first direction encodes a digital 1, and the magnetic polarity in a second direction encodes a digital 0. A bit cell is the shortest length of the track 132 to which a particular magnetic polarity is written. Accordingly, a magnetic transition from one bit cell to the next bit cell indicates a change from one digital character to another.

The disk 108 is formed by depositing a magnetic film on a rigid substrate. The thickness of the magnetic film must be closely controlled. Where the magnetic film is too thin, the magnetic flux density produced by a magnetic transition will be too weak. The disk 108 may also contain other defects, such as scratches or pits, that degrade the magnetic flux density produced by a magnetic transition. These defects can occur during the manufacture of the disk 108 or during the assembly of the disk drive 100.

The disk drive 100 is subject to numerous qualification tests to ensure reliable storage and retrieval of user data once delivered to an end user. Flaw scan is one such qualification test. Flaw scan identifies areas of the disk 108 that may not reliably store user data. Flaw scan writes a data pattern to the data fields 204 (and any other writable areas of the disk 108) and then reads the data pattern from the data fields 204 (and any other writable areas of the disk 108) following assembly of the disk drive 100. The magnetic polarity in the data pattern can alternate every bit cell to produce a 1T data pattern, or every $i^{th}$ bit cell to produce an iT data pattern where i is an integer. For instance, the magnetic polarity can alternate every two bit cells to produce a 2T data pattern (110011001100 . . . ), every three bit cells to produce a 3T data pattern (111000111000 . . . ) and so on.

The transducer head 124 generates a read signal in response to reading the data pattern from the disk 108, and the read signal includes pulses caused by the magnetic transitions in the data pattern. The isolated pulse width (PW50) is the distance between the points of intersection between an isolated pulse and a line indicating 50% of the maximum amplitude of the isolated pulse. Intersymbol interference is the alteration of an isolated pulse due to linear superposition of other pulses in close proximity.

Data patterns with long periods (iT) that occupy a length of the track 132 that is greater than the PW50 of a read signal derived from the disk 108 cause the transducer head 124 to generate a read signal with greater amplitude due to decreased intersymbol interference. Alternatively, data patterns with short periods that occupy a length of the track 132 that is less than the PW50 increase the likelihood of detecting a flaw or the inability of a particular length of the track 132 to produce the prescribed magnetic flux density.

The channel 140 includes a partial response maximum likelihood (PRML) detector (not shown) that accurately detects the data patterns even when the user data is written on the disk 108 at high bit density and the read signal exhibits intersymbol interference. The PRML detector samples the read signal at regular time intervals and determines a code word that symbolizes a set of pulses using a statistical maximum likelihood or Viterbi process. For instance, the PRML detector detects a data pattern when the PW50 contains 2.5 bits of information. Accordingly, the PRML detector allows user data to be recorded at higher density than a peak detector since the peak detector is incapable of reliably decoding pulses with intersymbol interference.

The channel 140 often uses a 2T preamble to synchronize sample times (phase) and determine signal amplitudes to adjust the gain. When the phase and gain are properly adjusted, a 2T sampled waveform in the channel 140 produces a distinctive pattern. Furthermore, flaw scan often uses a 2T data pattern because of the high magnetic transition rate, low intersymbol interference, availability in the channel 140 and unique sampled pattern it produces in the channel 140.

FIG. 3 is a flow chart of a conventional flaw scan. The transducer head 124 writes a data pattern to the data fields 204 (step 300) and then reads the data pattern from the data fields 204 to obtain n−1 samples (step 304) and then a next sample (the $n^{th}$ sample) (step 308). The channel 140 serially determines whether each of the previous n samples have an amplitude that is less than a threshold value (step 312). If at least one of the previous n samples has an amplitude that is greater than the threshold value, then the channel 140 returns to step 308 to take a next sample. Otherwise, the channel 140 reports a flaw to the controller 136 (step 316) and returns to step 308 to take a next sample.

Conventional flaw scan is susceptible to erroneously qualifying a series of bit cells where noise or some other disturbance causes one or more samples to exceed the threshold value. As a result, areas of the disk 108 that cannot reliably store user data may nonetheless be qualified. Although the disk drive 100 uses error correction code (ECC) to tolerate some errors, the storage reliability could still be compromised. Similarly, conventional flaw scan is susceptible to erroneously disqualifying a length of the track 132 that does not contain errors in the presence of a sustained noise event that causes a series of samples to fall below the threshold value. This unnecessarily reduces the storage capacity of the disk drive 100.

Conventional flaw scan typically makes two or more passes over each surface of every disk 108 in the disk drive 100 to reduce soft errors caused by random noise and thus increase the likelihood that flaws will be detected and decrease the likelihood that false errors will be reported. However, multiple flaw scans increase manufacturing time and decrease manufacturing throughput.

There is, therefore, a need for a flaw scan that detects flaws and avoids false errors with high confidence with fewer passes and is inexpensive to implement.

SUMMARY OF THE INVENTION

The present invention detects flaws in storage media with a higher degree of statistical confidence and thus fewer passes than conventional flaw scan techniques using existing devices such as a PRML channel.

In an embodiment, detecting flaws in a disk drive includes sampling a read signal provided by reading a data pattern from a disk to obtain samples, obtaining significant samples from the samples, deriving a value from the significant samples, and reporting a flaw if a comparison between the derived value and a threshold value is unacceptable.

In another embodiment, the data pattern is an iT pattern that includes a magnetic transition every $i^{th}$ bit cell on a track in which it is written.

In another embodiment, the significant samples are taken at times corresponding to expected peak and near peak values in the read signal, which in turn correspond to magnetic transitions in the data pattern, and the significant samples each have an amplitude greater than 50% of an amplitude of an isolated pulse in the read signal.

In another embodiment, the significant samples are obtained by filtering the samples using a digital band pass filter. For example, the data pattern is a 2T data pattern and the filter has a delay operator notation of $1-D^2+D^4-D^6 \ldots \pm D^{2n}$ where n is the number of samples under consideration. As another example, the data pattern is a 3T data pattern and the filter has a delay operator notation of $1+D-D^3-D^4+D^6+D^7 \ldots [-/+D^{n-1}-/+D^n]$.

In another embodiment, the derived value is a sum, an average or an integration of the magnitudes of the significant samples, or of difference values between an optimal value and the magnitudes of the significant samples.

In another embodiment, the comparison between the derived value and the threshold value is unacceptable if the derived value is less than the threshold value.

Further advantages of the present invention will become readily apparent from the following discussion, particularly when taken together with the accompanying drawings.

BRIEF DESCRIPTION OF THE DRAWINGS

FIG. 5 illustrates a read signal influenced by intersymbol interference and a flaw;

FIG. 6 is a flow chart of a flaw scan in accordance with the present invention.

DETAILED DESCRIPTION

Figure 1:
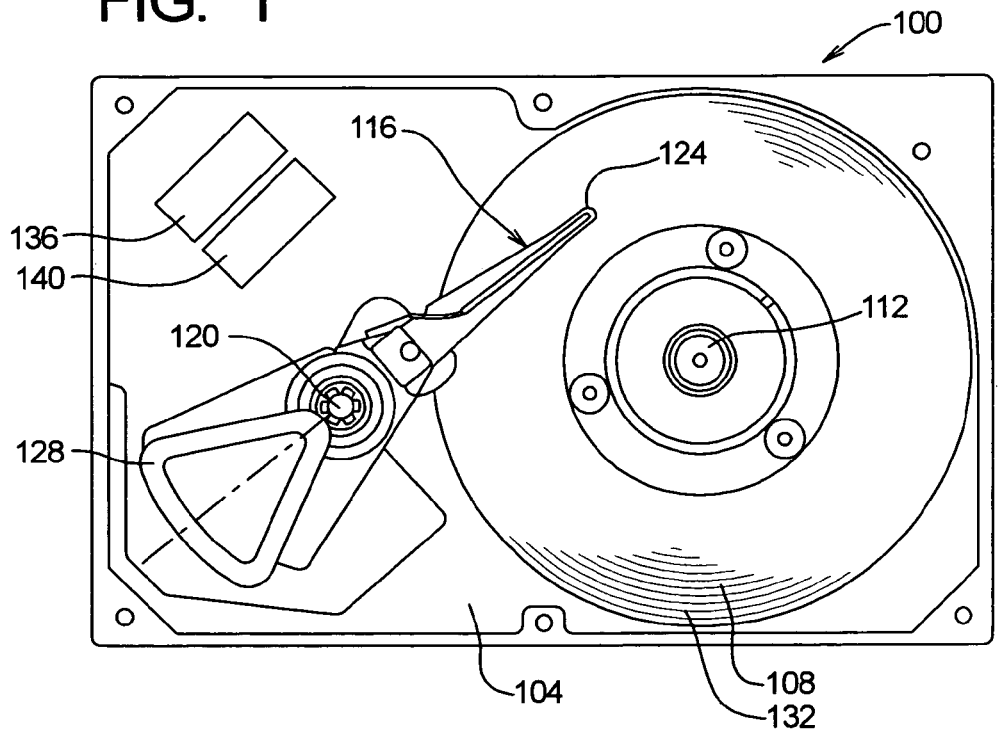
FIG. 1 is a top view of a conventional disk drive with the cover removed.
Figure 2:
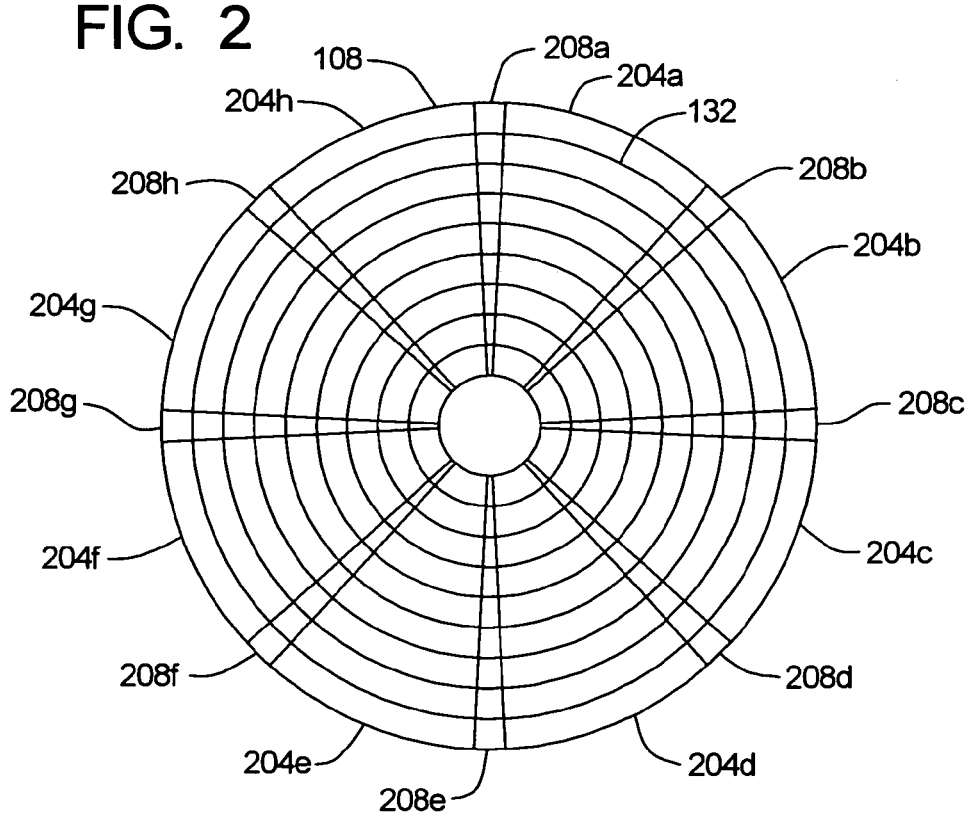
FIG. 2 is a diagrammatic representation of a disk.
Figure 3:
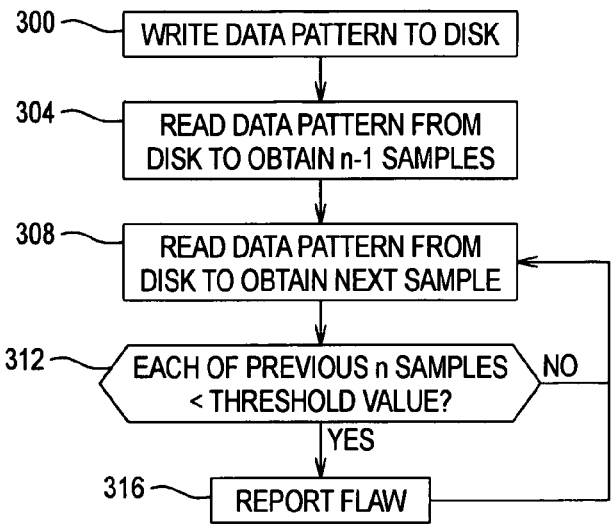
FIG. 3 is a flow chart of a conventional flaw scan.
Figure 4A:
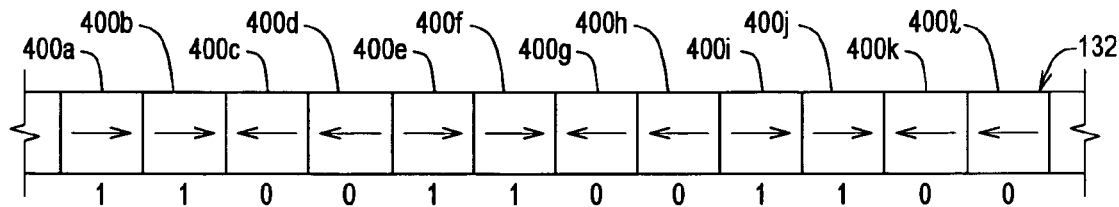
FIG. 4A illustrates a data pattern written to a track on the disk.

FIG. 4A illustrates a data pattern written to the track 132 along a cross-sectional portion of the track 132. The data pattern is written to bit cells 400a-400l. The arrows in the bit cells 400 indicate the magnetic polarity of the bit cells 400. In bit cells 400a, 400b, 400e, 400f, 400i and 400j the magnetic polarity in a first direction encodes a digital 1, and in bit cells 400c, 400d, 400g, 400h, 400k and 400l the magnetic polarity in a second direction encodes a digital 0. Thus, the data pattern is a 2T data pattern and the digital characters alternately repeat for two bit cells 400.

Figure 4B:
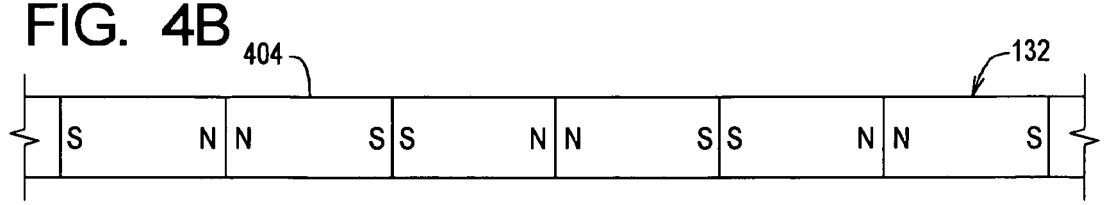
FIG. 4B illustrates magnetic transitions in the data pattern in FIG. 4A.

FIG. 4B illustrates the magnetic transitions in the data pattern. The bit cells 400 as magnetized by the data pattern effectively form a series of magnets 404 in the track 132. The boundaries between the magnets 404 correspond to the boundaries between the bit cells 400 containing opposite magnetic polarities. Thus, the magnetic transitions occur at the boundaries between the bit cells 400b and 400c, 400d and 400e, 400f and 400g, 400h and 400i, and 400j and 400k. Furthermore, the magnetic flux produced by the magnets 404 is normal to the disk 108 at the boundaries and substantially parallel to the disk 108 away from the boundaries.

Figure 4C:
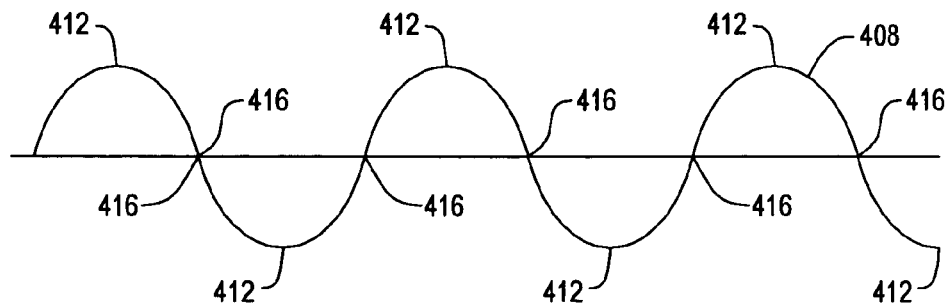
FIG. 4C illustrates a read signal provided by reading the data pattern in FIG. 4A.

FIG. 4C illustrates a read signal 408 provided by the transducer head 124 as it passes through the magnetic flux produced by the bit cells 400 and reads the data pattern from the disk 108. The read signal 408 includes peaks 412 that correspond to the magnetic transitions and zero-crossings 416 midway between the magnetic transitions.

FIG. 5 illustrates a read signal 500 influenced by intersymbol interference and a flaw. The read signal 500 has a irregular waveform shape due to intersymbol interference. The read signal 500 includes peak 504 with optimal amplitude and peaks 508a–508e with attenuated amplitude relative to the other peaks. Since the attenuated amplitude is significantly diminished and occurs in five peaks in a row, it is unlikely that the attenuated amplitude is due to noise. Instead, the attenuated amplitude is probably due to a flaw in the disk 108.

Conventional flaw scan may not detect this flaw. Conventional flaw scan may require a greater number of consecutive attenuated peaks than five. Conventional flaw scan is also insensitive to slight variations in amplitude loss, and if the read signal 500 contains a particularly deeply diminished peak, illustrated as alternate peak 512, then conventional flaw scan does not take this into consideration. Furthermore, conventional flaw scan may fail to detect a flaw if even one of the peaks 508, illustrated as alternate peak 516, has an amplitude greater than the threshold value.

FIG. 6 is a flow chart of a flaw scan in accordance with the present invention. The transducer head 124 writes a data pattern to the data fields 204 (step 600) and then reads the data pattern from the data fields 204 to obtain n–1 samples (step 604) and then a next sample (the $n^{th}$ sample) (step 608).

The channel 140 filters the n samples using a digital band pass filter to obtain m significant samples from the n samples (step 612). The significant samples are taken (sampled) at times corresponding to the expected peak and near peak values in the read signal, which in turn correspond to the magnetic transitions in the data pattern read from the disk 108. The significant samples each have an amplitude greater than 50% of an amplitude of an isolated pulse in the read signal. Furthermore, the significant samples each have an amplitude greater than the other samples of the n samples. Thus, the filtering passes the significant samples with the largest amplitudes and discards the other samples. For instance, the filtering passes the significant samples taken at or near the peaks 412 and discards the samples taken at or near the zero-crossings 416.

For example, the data pattern is a 2T data pattern and the filter has a delay operator notation of $1-D^2+D^4-D^6 \ldots \pm D^{2n}$. As another example, the data pattern is a 3T data pattern and the filter has a delay operator notation of $1+D-D^3-D^4+D^6+D^7 \ldots [-/+D^{n-1}-/+D^n]$. In either case, the filtering inverts various samples so that the significant samples have the same sign, and the significant samples are determined in accordance with the data pattern and the partial response of the channel 140.

Advantageously, the filtering increases the signal-to-noise ratio by retaining only the peak and near peak samples taken at times corresponding to the magnetic transitions in the data pattern and discarding the other samples where noise can greatly affect the signal amplitude. In particular, the filtering reduces the noise bandwidth by the square root of 1/m where m is the number of the significant samples that are considered. As a result, the channel 140 more accurately distinguishes flaws from noise.

The channel 140 selects a predetermined number of the previous significant samples using a moving window on a first-in first-out (FIFO) basis (step 616) and derives a value based on the selected significant samples (step 620). As examples, the derived value is a sum, an average or an integration of the magnitudes of the significant samples, or a sum, an average or an integration of difference values between an optimal value and the magnitudes of the significant samples.

The channel 140 determines whether the derived value is less than a threshold value (step 624). If not, then the channel 140 returns to step 608 to take a next sample. Otherwise, the channel 140 reports a flaw to the controller 136 (step 628) and returns to step 608 to take a next sample.

For example, the data pattern is a 2T data pattern, m is equal to 5, the filter has a delay operator notation of $1-D^2+D^4-D^6+D^8$, the samples are quantized into integer values ranging from –30 to +30, the partial response of the channel 140 defines the optimal peak amplitude as 16, the derived value is a sum of the significant samples and the sum is 5×16=80.

The threshold value depends on the partial response of the channel 140. For example, where the read signal is quantized into integer values ranging from –30 to +30, and the optimal peak amplitude is 16, a threshold value of less than 16 is selected for comparison with an average of the absolute value of each of the previous m significant samples. Likewise, a threshold value of less than m×16 is selected for comparison with a sum or integrated value of the absolute values of the previous m significant samples. A threshold value is about 50–90% of the accumulated value is suitable. The threshold value also depends on the size of the defects to be detected.

Figure 7:
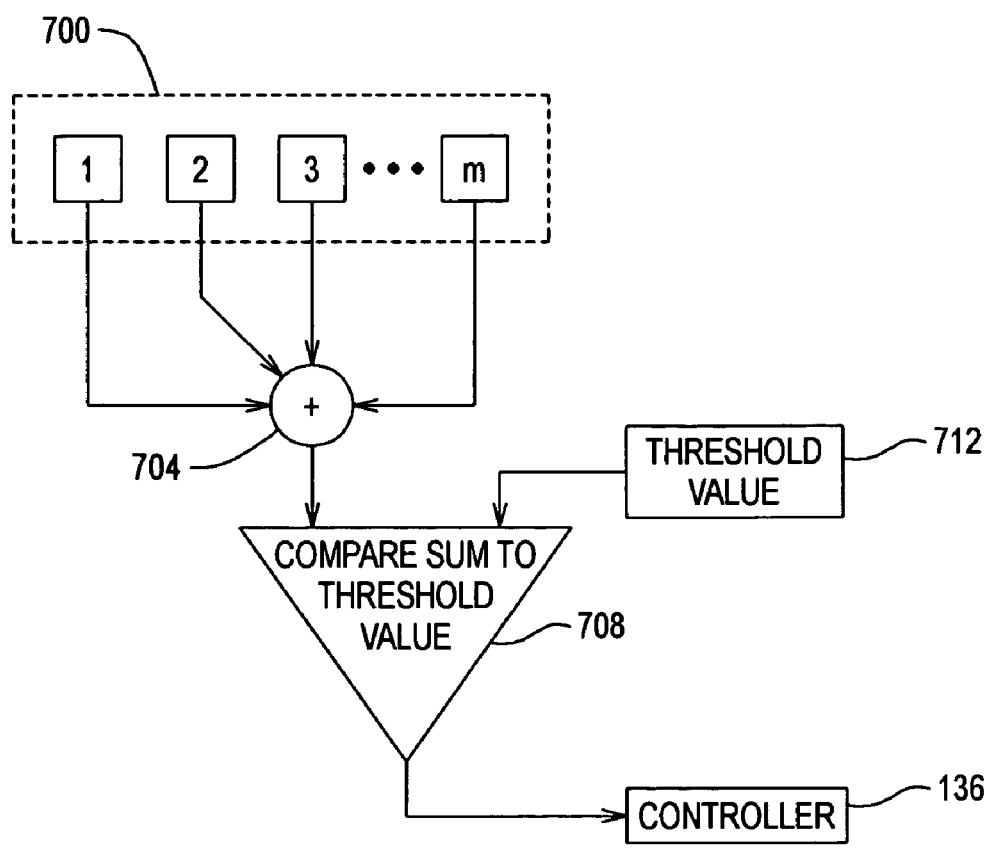
FIG. 7 illustrates a functional hardware diagram to implement a flaw scan in accordance with the present invention.

FIG. 7 illustrates a functional hardware diagram to implement a flaw scan in accordance with the present invention. A shift register 700 receives the significant samples from the filter (not shown) on a FIFO basis and temporarily stores the significant samples as the absolute values of their magnitudes. The shift register 700 continually feeds the significant samples to a summing block 704. The summing block 704 calculates the derived value as a sum of the significant samples and the derived value (sum) is continually clocked to a comparator 708. A memory 712 provides the threshold value to the comparator 708. The comparator 708 compares the sum with the threshold value and sends a flaw detect signal to the controller 136 if the sum is less than the threshold value. In this manner, the shift register 700, the summing block 704 and the comparator 708 implement steps 616, 620, and 624 and 628, respectively.

Although the present invention has been described in connection with the disk drive 100, the present invention may be applied to any storage device such as optical, tape and three-dimensional storage devices. Similarly, the present invention may be implemented in the disk drive 100 as software code running on a microprocessor or as firmware code running in the controller 136 and/or channel 140. Likewise, although the present invention has been described in connection with a longitudinal recording disk 108, the present invention is equally applicable to a perpendicular recording disk. And although the signal-to-noise ratio can be increased by increasing the period of an iT data pattern (at least until the effective channel bit density is one), the present invention is applicable to any data pattern including a 1T data pattern.

The foregoing discussion of the invention has been presented for purposes of illustration and description. Further, the description is not intended to limit the invention to the form disclosed herein. Consequently, variations and modifications commensurate with the above teachings, within the skill and knowledge of the relevant art, are within the scope of the present invention. The embodiments herein are further intended to explain the best mode presently known of practicing the invention and to enable others skilled in the art to utilize the invention in such or in other embodiments and with various modifications required by their particular application or use of the invention. It is intended that the appended claims include alternative embodiments to the extent permitted by the prior art.

What is claimed is:

1. A method for detecting flaws in a disk drive, comprising:
   sampling a read signal provided by reading a data pattern from a track on a disk to obtain n samples;
   deriving a value from m of the n samples, wherein the m samples are significant samples that each have an amplitude greater than 50% of an amplitude of an isolated pulse in the read signal and greater than an amplitude of the other samples of the n samples;
   comparing the derived value to a threshold value; and
   reporting a flaw in the track if the comparison is unacceptable.

2. The method of claim 1, wherein the m samples are taken at times corresponding to expected peak and near peak values in the read signal, and the other samples are not taken at times corresponding to expected peak and near peak values in the read signal.

3. The method of claim 1, wherein the derived value is a sum of magnitudes of the m samples.

4. The method of claim 1, wherein the derived value is an average of
   magnitudes of the m samples.

5. The method of claim 1, wherein the derived value is an integration of
   magnitudes of the m samples.

6. The method of claim 1, wherein the derived value is based on difference values
   between magnitudes of the m samples and an optimal value.

7. The method of claim 6, wherein the derived value is a sum of the difference values.

8. The method of claim 6, wherein the derived value is an average of the difference values.

9. The method of claim 6, wherein the derived value is an integration of the difference values.

10. The method of claim 1, wherein deriving the derived value includes
    filtering the n samples to obtain the m samples and to discard the other samples.

11. The method of claim 10, wherein the data pattern is a 2T data pattern, and the filtering has a delay operator notation of $1-D^2+D^4-D^6 \ldots \pm D^{2n}$.

12. The method of claim 10, wherein the data pattern is a 3T data pattern, and the filtering has a delay operator notation of $1+D-D^3-D^4+D^6+D^7 \ldots [-/+D^{n-1}-/+D^n]$.

13. The method of claim 1, wherein the significant samples contain intersymbol interference.

14. The method of claim 1, wherein m is 50% of n.

15. The method of claim 1, wherein m is 5.

16. A method for detecting flaws in a disk drive, comprising:
    magnetizing bit cells on a disk by writing a data pattern to the bit cells;
    reading the data pattern from the bit cells to provide a read signal;
    sampling the read signal to obtain n samples;
    selecting m of the n samples, wherein the m samples are significant samples that are taken at times corresponding to expected peak and near peak values in the read signal and that each have an amplitude greater than 50% of an amplitude of an isolated pulse in the read signal, and the other samples of the n samples are not taken at times corresponding to expected peak and near peak values in the read signal;
    deriving a value from the m samples;
    comparing the derived value to a threshold value; and
    reporting a flaw in the bit cells if the comparison is unacceptable.

17. The method of claim 16, wherein the derived value is a sum of an absolute value of each of the m samples.

18. The method of claim 16, wherein the derived value is an average of
    an absolute value of each of the m samples.

19. The method of claim 16, wherein the derived value is based on difference values
    between an absolute value of each of the m samples and an optimal value.

20. The method of claim 19, wherein the derived value is a sum of the difference values.

21. The method of claim 19, wherein the derived value is an average of the difference values.

22. The method of claim 19, wherein the derived value is an integration of the difference values.

23. The method of claim 16, wherein selecting the m samples includes
    filtering the n samples to pass the m samples and discard the other samples.

24. The method of claim 23, wherein the data pattern is an iT data pattern that causes a magnetic transition every $i^{th}$ bit cell, and the filtering increases a signal-to-noise ratio of the m samples.

25. The method of claim 23, wherein the data pattern is a 2T data pattern that causes a magnetic transition every second bit cell, and the filtering has a delay operator notation of $1-D^2+D^4-D^6 \ldots \pm D^{2n}$.

26. The method of claim 23, wherein the data pattern is a 3T data pattern that causes a magnetic transition every third bit cell, and the filtering has a delay operator notation of $1+D-D^3-D^4+D^6+D^7 \ldots [-/+D^{n-1}-/+D^n]$.

27. The method of claim 16, including:
    storing the m samples in a shift register;
    summing the m samples in a summing block to obtain the derived value; and
    comparing the derived value to the threshold value in a comparator.

28. The method of claim 16, including selecting the m samples at times corresponding to magnetic transitions in the data pattern.

29. The method of claim 16, including selecting the m samples using a moving window.

30. The method of claim 16, including performing the method in a PRML channel in the disk drive.

31. A method for detecting flaws in a disk in a disk drive, comprising:
    writing a data pattern to a track on the disk using a transducer head;
    reading the data pattern from the track to provide a read signal using the transducer head;
    sampling the read signal to obtain samples;
    filtering the samples to obtain significant samples that each have sufficient amplitude and discard other samples that each have insufficient amplitude;
    deriving a value from the significant samples and from no other samples in the read signal;
    comparing the derived value to a threshold value; and
    reporting a flaw in the track if the comparison is unacceptable.

32. The method of claim 31, wherein the significant samples each have an amplitude greater than a predetermined percentage of an amplitude of an isolated pulse in the read signal.

33. The method of claim 31, wherein the significant samples each have an amplitude greater than 50% of an amplitude of an isolated pulse in the read signal.

34. The method of claim 31, wherein the significant samples are taken at times corresponding to expected peak and near peak values in the read signal, and the other samples are not taken at times corresponding to expected peak and near peak values in the read signal.

35. The method of claim 34, wherein the expected peak and near peak values correspond to magnetic transitions in the data pattern.

36. The method of claim 35, wherein the magnetic transitions occur periodically every $i^{th}$ bit cell in the track.

37. The method of claim 31, wherein the significant samples include intersymbol interference.

38. The method of claim 31, wherein the significant samples exclude zero-crossings in the read signal.

39. The method of claim 31, wherein the filtering increases a signal-to-noise ratio of the significant samples.

40. The method of claim 31, wherein the data pattern is a 2T data pattern that includes magnetic transitions every two bit cells in the track, and the filtering has a delay operator notation of $1-D^2+D^4-D^6 \ldots \pm D^{2n}$.

41. The method of claim 31, wherein the data pattern is a 3T data pattern that includes magnetic transitions every three bit cells in the track, and the filtering has a delay operator notation of $1+D-D^3-D^4+D^6+D^7 \ldots [-/+D^{n-1}-/+D^n]$.

42. The method of claim 31, wherein deriving the derived value includes selecting a predetermined number of the significant samples using a moving window.

43. The method of claim 42, wherein the predetermined number is five.

44. The method of claim 31, wherein deriving the derived value includes adding magnitudes of the significant samples.

45. The method of claim 31, wherein deriving the derived value includes averaging magnitudes of the significant samples.

46. The method of claim 31, wherein deriving the derived value includes integrating magnitudes of the significant samples.

47. The method of claim 31, including reporting the flaw if the derived value is less than the threshold value.

48. The method of claim 31, including:
   storing the significant samples in a shift register on a FIFO basis;
   transferring the significant samples from the shift register to a summing block;
   summing the significant samples in the summing block to obtain the derived value;
   transferring the derived value from the summing block to a comparator;
   comparing the derived value to the threshold value in the comparator; and
   generating a flaw detect signal in the comparator if the comparison is unacceptable.

49. The method of claim 31, including performing the method in a PRML channel in the disk drive.

50. The method of claim 49, including the channel reporting the flaw to a controller in the disk drive.

51. A method for detecting flaws in a disk in a disk drive, comprising:
   writing a data pattern to a track on the disk using a transducer head;
   reading the data pattern from the track to provide a read signal using the transducer head;
   sampling the read signal to obtain samples;
   filtering the samples to obtain significant samples and discard other samples, wherein the significant samples are taken at times corresponding to expected peak and near peak values in the read signal and each have an amplitude greater than 50% of an amplitude of an isolated pulse in the read signal, the other samples are not taken at times corresponding to expected peak and near peak values in the read signal, and the expected peak and near peak values correspond to magnetic transitions in the data pattern;
   selecting a predetermined number of the significant samples using a moving window;
   deriving a value from the selected significant samples and from no other samples in the read signal;
   comparing the derived value to a threshold value; and
   reporting a flaw in the track if the comparison is unacceptable.

52. The method of claim 51, wherein the filtering increases a signal-to-noise ratio of the significant samples.

53. The method of claim 51, wherein the filtering discards zero-crossing samples in the read signal.

54. The method of claim 51, wherein the data pattern is a 2T data pattern that includes magnetic transitions every two bit cells in the track, and the filtering has a delay operator notation of $1-D^2+D^4-D^6 \ldots \pm D^{2n}$.

55. The method of claim 51, wherein the data pattern is a 3T data pattern that includes magnetic transitions every three bit cells in the track, and the filtering has a delay operator notation of $1+D-D^3-D^4+D^6+D^7 \ldots [-/+D^{n-1}-/+D^n]$.

56. The method of claim 51, wherein deriving the derived value includes adding magnitudes of the selected significant samples.

57. The method of claim 51, wherein deriving the derived value includes averaging magnitudes of the selected significant samples.

58. The method of claim 51, wherein deriving the derived value includes integrating magnitudes of the selected significant samples.

59. The method of claim 51, including:
   storing the significant samples in a shift register on a FIFO basis;
   transferring the significant samples from the shift register to a summing block;
   summing the significant samples in the summing block to obtain the derived value;
   transferring the derived value from the summing block to a comparator;
   comparing the derived value to the threshold value in the comparator; and
   generating a flaw detect signal in the comparator if the comparison is unacceptable.

60. The method of claim 51, including performing the method in a PRML channel in the disk drive during manufacture of the disk drive after assembly of the disk drive.

61. A method for detecting flaws in a disk in a disk drive, comprising:
   writing a data pattern to a track on the disk using a transducer head;
   reading the data pattern from the track to provide a read signal using the transducer head;
   sampling the read signal to obtain samples that contain intersymbol interference;
   filtering the samples to obtain significant samples and discard other samples, wherein the significant samples are taken at times corresponding to expected peak and near peak values in the read signal and each have an amplitude greater than 50% of an amplitude of an isolated pulse in the read signal, the other samples are not taken at times corresponding to expected peak and near peak values in the read signal, and the expected peak and near peak values correspond to magnetic transitions in the data pattern;

selecting a predetermined number of the significant samples using a moving window;

deriving a value from the selected significant samples and from no other samples in the read signal;

comparing the derived value to a threshold value; and reporting a flaw in the track if the derived value is less than the threshold value.

62. The method of claim 61, wherein the filtering increases a signal-to-noise ratio of the significant samples.

63. The method of claim 61, wherein the filtering discards zero-crossing samples in the read signal.

64. The method of claim 61, wherein the data pattern is a 2T data pattern that includes magnetic transitions every two bit cells in the track, and the filtering has a delay operator notation of $1-D^2+D^4-D^6 \ldots \pm D^{2n}$.

65. The method of claim 61, wherein the data pattern is a 3T data pattern that includes magnetic transitions every three bit cells in the track, and the filtering has a delay operator notation of $1+D-D^3-D^4+D^6+D^7 \ldots [-/+D^{n-1}-/+D^n]$.

66. The method of claim 61, wherein deriving the derived value includes adding magnitudes of the selected significant samples.

67. The method of claim 61, wherein deriving the derived value includes averaging magnitudes of the selected significant samples.

68. The method of claim 61, wherein deriving the derived value includes integrating magnitudes of the selected significant samples.

69. The method of claim 61, including:

storing the significant samples in a shift register on a FIFO basis;

transferring the significant samples from the shift register to a summing block;

summing the significant samples in the summing block to obtain the derived value;

transferring the derived value from the summing block to a comparator;

comparing the derived value to the threshold value in the comparator; and generating a flaw detect signal in the comparator if the derived value is less than the threshold value.

70. The method of claim 61, including performing the method in a PRML channel in the disk drive during manufacture of the disk drive after assembly of the disk drive.

* * * * *